LINCOLN & DOUGLASS.
Car Brake.
No. 24,943.
Patented Aug. 2, 1859.
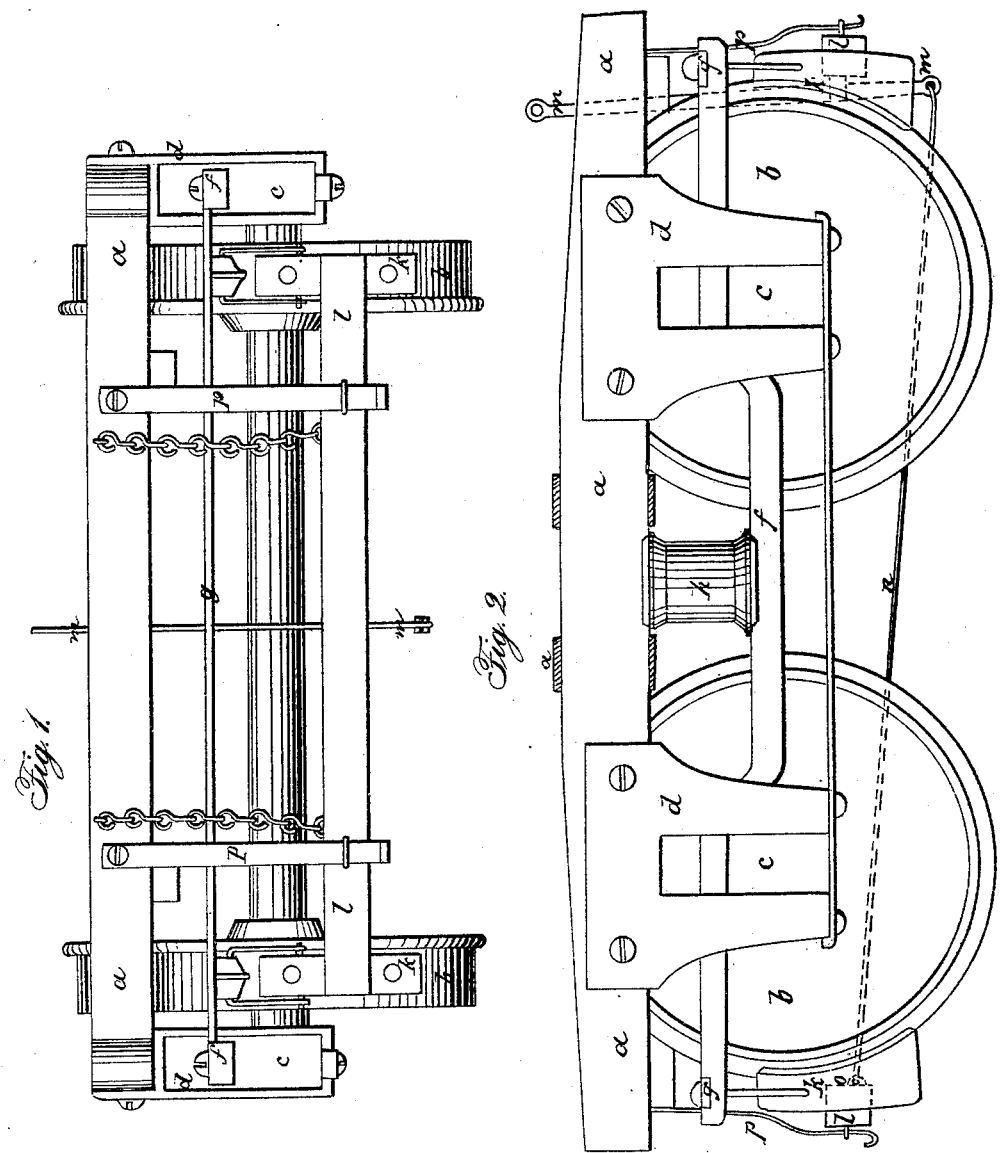
Witnesses:
Inventor:

UNITED STATES PATENT OFFICE.

H. A. LINCOLN AND H. T. DOUGLASS, OF NEW HAVEN, CONNECTICUT.

BRAKE FOR RAILROAD-CARS.

Specification of Letters Patent No. 24,943, dated August 2, 1859.

*To all whom it may concern:*

Be it known that we, H. A. LINCOLN and H. T. DOUGLASS, both of New Haven, in the State of Connecticut, have invented a certain new and useful Improvement in Railroad-Cars, and that the following description, taken in connection with the drawings, is a full, clear, and exact description thereof.

The object of our invention is to cause a rail road car mounted upon trucks or bearing carriages to move more smoothly and equably when the brakes are applied and when they are being removed, while at the same time the brake shoes and wheels are caused to wear more equably and the car can be mounted in such a manner on the springs that the vertical oscillations of the wheels may be felt less or may impart less shock to the car body than under arrangements now generally in use. And to this end the nature of our invention consists in supporting the brake shoes upon the ends of a spring yoke or equalizing beam, in such manner that the shoes shall be outside of the wheels and practically rise and fall with the wheels of a truck when this is combined with bearing springs, which support the load and transfer it to the same spring yoke, the arrangement being substantially such as is hereafter specified.

The drawings are a side and end view of a rail road truck with our invention applied thereto and in them the framing of the truck is represented at *a, a, a,* the wheels are shown at *b b,* the axle-boxes at *c c,* and the pedestals at *d d,* the boxes being as usual free to rise and fall in the pedestals.

Over the pedestals lie the equalizing beams, such as *f f,* there being one beam on each side of the truck and the four ends being connected by bars such as *g,* so that the whole forms a rectangle commonly known as a spring yoke.

Between the wheel pedestals are springs such as *h,* which rest upon the equalizing beams between the two wheels on each side of the truck and upon these springs the weight of the car is to be supported through the intervention of sway beams or in any other proper manner.

To the connecting bars *g,* are attached stirrups by means of which brake shoes such as *k k* are supported, there being one shoe for each wheel, and the shoes being outside of the wheels; or in other words the wheels lie in the space between the shoes.

The shoes on opposite sides are to be connected by beams such as *l* and to one of the latter is to be secured the pivot of a lever such as *m,* the lower end of which is to be connected by a rod such as *n* to the connecting beam at the other side of the truck, by a proper eye or pivot as at *o,* the object of the whole arrangement being to cause all four of the shoes to approach the wheels and bear upon them when the lever is acted upon by any proper force.

Springs such as *p p* are bolted to the end framing and their free ends are embraced by staples such as shown in the drawings as attached to the beams connecting the shoes; these springs serving to remove the shoes away from the treads of the wheels when the upper end of the lever is released.

An inspection of the drawings thus described will show the experienced engineer: First—that the brake shoes are mounted upon a support moving vertically as the wheels move, or nearly so, and that the former will therefore not slide on the latter any more than is due to the rotating movements of the wheels, thus causing both the wheel treads and shoes to wear more equably and causing the force applied to the brake lever to be applied equally even under great vertical oscillations of the wheels. Second—that the brakes being supported in the spring yokes while the car is supported on springs resting on the same yoke, will not tend when applied, to twist the spring either forward or backward, thus permitting the use of one spring at or near the center of each yoke or equalizing beams, under which arrangement the vertical oscillations of each wheel are not wholly impressed upon the spring, but on the contrary the spring is relieved from a part of the motion of each wheel in the truck much in the same way that the jars in the body of a car are relieved by using end trucks as contrasted with wheels at or near the center of the car, without any trucks. And thirdly that when the brakes are applied there will be no compression of the springs, so that the car moves roughly as if overloaded; while on the withdrawal of the brakes there will be no sudden rebound.

To constitute or make up our contrivance it is necessary that the brake shoes should be outside of the wheels, not between them, that they should be supported as described on a support moving up and down with the wheels, partaking of their vertical oscillations and not upon the car body or some part of the truck between which and the wheel springs are interposed; and that the springs should lie between the wheels upon the equalizing beams or some equivalent thereof.

We therefore claim as of our own invention—

The combined arrangement herein described of brake shoes, truck wheels, equalizing beams, and springs, the former being outside of the wheels and so supported as to rise and fall practically with the wheels, while the equalizing beams support the springs and the springs are arranged between the wheels and transfer the weight to be carried to the equalizing beams; the several parts acting in combination substantially in the manner for the purposes specified.

In testimony whereof, we have hereunto subscribed our names in the city of New Haven on this 21st day of March A. D. 1859.

HENRY A. LINCOLN.
   HEBRON T. DOUGLASS.

In presence of—
 E. I. SANFORD,
 J. G. BROWN.